US009230377B2

(12) United States Patent
Gaddam et al.

(10) Patent No.: US 9,230,377 B2
(45) Date of Patent: Jan. 5, 2016

(54) MOBILE DEVICE SECURITY (71) Applicant: CELLCO PARTNERSHIP, Basking Ridge, NJ (US)

(72) Inventors: Venkateswara Rao Gaddam, Bridgewater, NJ (US); Sankar Shanmugam, Dayton, NJ (US); Michelle Felt, Randolph, NJ (US); Ravi Kotyala, Warren, NJ (US); Alexander Papadopolo, Morristown, NJ (US); Neil Thomas Razzano, North Brunswick, NJ (US); John Edwin Straley, Hampton, NJ (US); Arulvadivel Venugopal, Franklin Park, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 216 days.

(21) Appl. No.: 13/956,264

(22) Filed: Jul. 31, 2013

(65) Prior Publication Data

US 2015/0035645 A1    Feb. 5, 2015

(51) Int. Cl.
*G07C 9/00* (2006.01)
*H04W 4/00* (2009.01)
*G06F 21/00* (2013.01)

(52) U.S. Cl.
CPC ............. *G07C 9/00111* (2013.01); *H04W 4/00* (2013.01); *G06F 21/00* (2013.01); *G07C 9/00031* (2013.01)

(58) Field of Classification Search
CPC ........... G07C 9/00007; G07C 9/00087; G07C 9/00111; G07C 9/00119; G07C 1/10; H04W 4/008; H04W 64/00; H04W 4/02; H04W 4/021; H04W 4/023; H04W 12/06; H04W 4/028
USPC .................................. 340/5.1, 5.7, 5.72, 5.61
See application file for complete search history.

(56) References Cited

U.S. PATENT DOCUMENTS

| 5,434,904 A | * | 7/1995 | Tsuzuki et al. | ............. 455/456.3 |
| 2002/0082142 A1 | * | 6/2002 | Cannon et al. | ..................... 482/1 |
| 2010/0009696 A1 | * | 1/2010 | Fok | ........................ H04W 64/00 455/456.1 |
| 2012/0229256 A1 | * | 9/2012 | Morse | ............... H04M 1/72572 340/8.1 |
| 2014/0187200 A1 | * | 7/2014 | Reitter et al. | .................. 455/410 |

* cited by examiner

*Primary Examiner* — Fekadeselassie Girma
*Assistant Examiner* — Yong Hang Jiang (57) ABSTRACT Systems and methods for providing mobile device security are disclosed. In some implementations, a request for access to a security mechanism is received at a user terminal. A short-range radio connection of the user terminal at a time of receiving the request for access is identified responsive to the request. A memory of the user terminal is accessed to determine whether the identified short-range radio connection corresponds to a user-identified secure radio connection. Upon determining that the radio connection corresponds to the user-identified secure radio connection, the user is granted access to the security mechanism without soliciting the user of the user terminal for a predetermined security input. Upon determining that the radio connection does not correspond to the user-identified secure radio connection, the user is solicited for the predetermined security input.

11 Claims, 5 Drawing Sheets

MOBILE DEVICE SECURITY

BACKGROUND

Some computing devices (e.g., mobile phone(s), tablet computer(s), laptop computer(s), etc.) include security mechanisms(s). A security mechanism, which may include, for example, a secure interface, may be a "home screen" on the computing device that provides access to data or applications on the device. The applications may, for example, include a telephone application, an email application, and a short messaging service application, which may be presented on the screen of the computing device via one or more computer icons after authenticated access to the security mechanism. The security mechanism may also include an interface for accessing a secure application executing on the device. The secure application may, for example, include an online banking application.

Security mechanisms are typically accessed by providing login credentials (e.g., a username and/or a password) to the computing device. Entering a password may be inconvenient under some circumstances, for example, when the user is driving a car. As the foregoing illustrates, a new approach for accessing a security mechanism on a computing device may be desirable.

In addition, security clearance procedures at security checkpoints, for example, at airports and at high-rise office buildings, may be cumbersome and time consuming for travelers or visitors to the high-rise office buildings who are low-risk. A traveler or visitor may be low-risk based on information known about the travelers or visitors (e.g., a visitor who is an employee working at the office building may be a low-risk visitor). As the foregoing illustrates, a new, less cumbersome approach for clearing a security checkpoint may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

In some implementations, the subject technology relates to techniques for accessing a security mechanism on a computing device (e.g., a mobile device). Typically, the security mechanism may be accessed by the user providing login credentials (e.g., a username and/or a password) to the computing device. According to some implementations of the subject technology, upon receiving the request for access to the security mechanism, the computing device determines whether a short-range radio (e.g., a WiFi radio or a Bluetooth® radio) of the computing device is connected to a preset external radio device which indicates that the computing device is likely being used by the primary user whose information is stored in the security mechanism (e.g., an owner of a mobile phone, rather than someone who stole or found the mobile phone). For example, the preset external radio device may be a WiFi radio in the user's home or office or a Bluetooth® microphone and speaker in the user's vehicle. A person who is not permitted to access the security mechanism (e.g., a person who found, stole, or borrowed the computing device) is unlikely to be located proximate to the preset external radio device(s) and therefore is unable to connect to the preset external radio device(s) for accessing the security mechanism. As such, the only way to access the security mechanism for such a person is by providing the security mechanism with a proper login credentials (e.g., username and/or password).

If the short-range radio is connected to the preset external radio device, the computing device may provide access to the security mechanism without verifying a security condition (e.g., an eight character alphanumeric password). The computing device may automatically provide access to the security mechanism or may verify a simpler security condition (e.g., a four digit password instead of the eight character alphanumeric password). If the short-range radio is not connected to the preset external radio device, the computing device may prompt the user for login credentials to verify the security condition. The login credentials may include the eight character alphanumeric password. Upon determining the user provided login credentials match the security condition, the user may be provided access to the security mechanism.

In some implementations, the subject technology relates to techniques for using a computing device (e.g., a mobile device) to assist in a security clearance at a specific location. The specific location may include, for example, a government building, an office building, or an airport. The computing device receives, via a radio of the computing device, radio signal(s). The radio signal(s) may correspond to global positioning system (GPS) signals indicating a geographic location of the computing device, WiFi signal(s), or near field communication (NFC) signals. The computing device stores, in a memory, indicia of the radio signal(s) and a timestamp corresponding to a time of receipt of the radio signal(s). Upon coming within the proximity of an external reader at the security checkpoint, the computing device provides the stored indicia of the radio signal(s) to the external reader. The stored indicia may be used to verify that a user of the computing device has permission to pass through a security checkpoint. These implementations of the subject technology may be used in multiple different use cases, several of which are discussed below.

In one use case, an office building may have a security check point for allowing only authorized personnel to enter the office building. The office building may be coupled with a parking garage. Some of the customers of the parking garage may be employees who work in the office building and, thus, are trusted to enter the office building. In some cases, customers of the parking garage who are not employees but who also work in the office building are also trusted to enter the office building, as they may be employed in neighboring office buildings and occasionally visit the office building for business or social reasons. The parking garage includes a short range communication device such as a NFC tag that is configured to send a signal to a mobile device, placed proximate to the NFC tag, indicating that the mobile device has been in the parking garage. The NFC tag may be active (i.e., have an active transmitter that continuously transmits the information) or may be passive (i.e., only transmitting the information to the mobile device when the NFC tag is activated by the mobile device). The NFC tag may be placed anywhere in the garage, for example, adjacent to a pedestrian or vehicular exit from the garage or an elevator of the garage so that a person parking his/her car at the garage is likely to pass by the NFC tag. Before, during or after parking his/her car, an employee of the office building receives, on his/her mobile phone, the signal from the NFC tag to indicate that he/she has been in the garage. The signal from the NFC tag is captured at the mobile phone, as described below, allowing the information from the NFC to be used at a later encountered associated electronic or personnel-manned security access point (or checkpoint) that is also accessible to individuals other than those able to interact with the NFC tag to modify the security needed to pass through the access point. In some embodiments, after the NFC tag information is captured by the mobile device, this information may be used by the security access point to reduce or eliminate the security needed to pass through the access point.

A user may be required to pass through another security checkpoint to access the garage. In some cases, in order to access the garage, the user may need to present a card or a sticker indicating that he/she has permission from an operator of the garage to park in the garage, indicating that the user is legitimately permitted to access the office building, further enhancing security by limiting users able to interact with the NFC tag to only those authorized and thus having secure access to the garage. When entering the office building and at the security check point, the employee may be asked to provide authorization information. For example, the employee may provide an employee identity card as the proper authorization information to access the building. The employee identity card may be used to access the building regardless of whether the employee has a mobile phone or has been to the parking garage. In some implementations, the mobile device of the employee provides indicia of the signal from the NFC tag indicating that the mobile device has been in the garage to a security checkpoint in the office building (e.g., via a network accessible using a cellular or WiFi network interface of the mobile device, or to a NFC reader, a Bluetooth reader, or any other reader at the security checkpoint) and, as a result, is permitted to pass through the security checkpoint and enter the office building. The indicia of the signal from the NFC tag may include a signature from the NFC tag coupled with a timestamp at the time the signature was transmitted from the NFC tag to the mobile device. The signal may be provided to a NFC reader as the mobile device comes within a communication range of the NFC reader at the security checkpoint. In some cases, the signal identifies that the mobile device has been in the parking garage but lacks any identifying information, such as an electronic identity card, of the user of the mobile device. In some implementations, if the security checkpoint lacks a NFC reader, the indicia of the signal from the NFC tag indicating that the mobile device has been in the garage are displayed on the screen of the mobile device for viewing by a security guard at the security checkpoint, for example, via an application executing on the mobile device. The application may display, in a window on a screen of the mobile device associated with the application, text stating that the instant mobile device was in the parking garage at a certain time. In some cases, the text does not include any identifying information of the user of the mobile device, such as an electronic identity card. The application may be executed by the user of the mobile device selecting the application from a set of applications (e.g., on a home screen of the mobile device).

In another use case, the disclosed technology may be used by a security manager of an airport for authorizing travelers to pass through the security check point at the airport. A security policy may be set that travelers at the security check point who have been at a known address, such as their home address, as indicated on their driver's license, or a stored work address within a threshold time period prior to arriving at the security checkpoint are less likely to be suspicious and thus, may pass through the security checkpoint more quickly. The threshold time period can be a fixed amount of time, for example, two hours. Alternatively, the threshold time period can be determined based on a distance and/or a travel time between the known address and the airport. The distance and/or the travel time can be determined using a mapping application and/or an application that provides walking, driving, or public transit directions as well as other possible events influencing the time, such as historical traffic conditions. In some examples, the threshold time period is determined based on the distance and/or the travel time if the distance and/or the travel time is within a certain range (e.g., distance below 250 kilometers or travel time below three hours).

To prove that a traveler was at the known address, a traveler may use an application to receive and store a GPS signal on his/her mobile phone, indicating that he/she was at the known address within the threshold time period prior to arriving at the security checkpoint. Alternatively, the traveler may use his/her mobile phone to provide other indicia that the traveler was at the known address, for example, a stored signal from a NFC tag, or other short-range radio device, at the known address. Upon arriving at the security checkpoint, the traveler presents his/her mobile phone and his/her driver's license to the security guard, and the security guard verifies (e.g., using an application of the mobile phone that displays information on the screen, a NFC reader that receives the indicia of the GPS signal from the mobile phone and a mapping software application or a network connection that transmits the indicia of the GPS signal and the time to a computer of the security guard over the network) that the traveler was at the known address within the threshold time period. As a result of this verification, the traveler is permitted to pass through a simplified security check rather than a full security check. For example, the full security check may include taking off ones shoes, removing ones laptop from ones handbag, and passing through a metal detector, whereas the simplified security check may include passing through the metal detector without taking off ones shoes or removing ones laptop from ones handbag. Another traveler, who is not coming from the known address or does not present evidence that he/she is coming from the known address, may need to undergo the full security check rather than the simplified security check.

Figure 1:
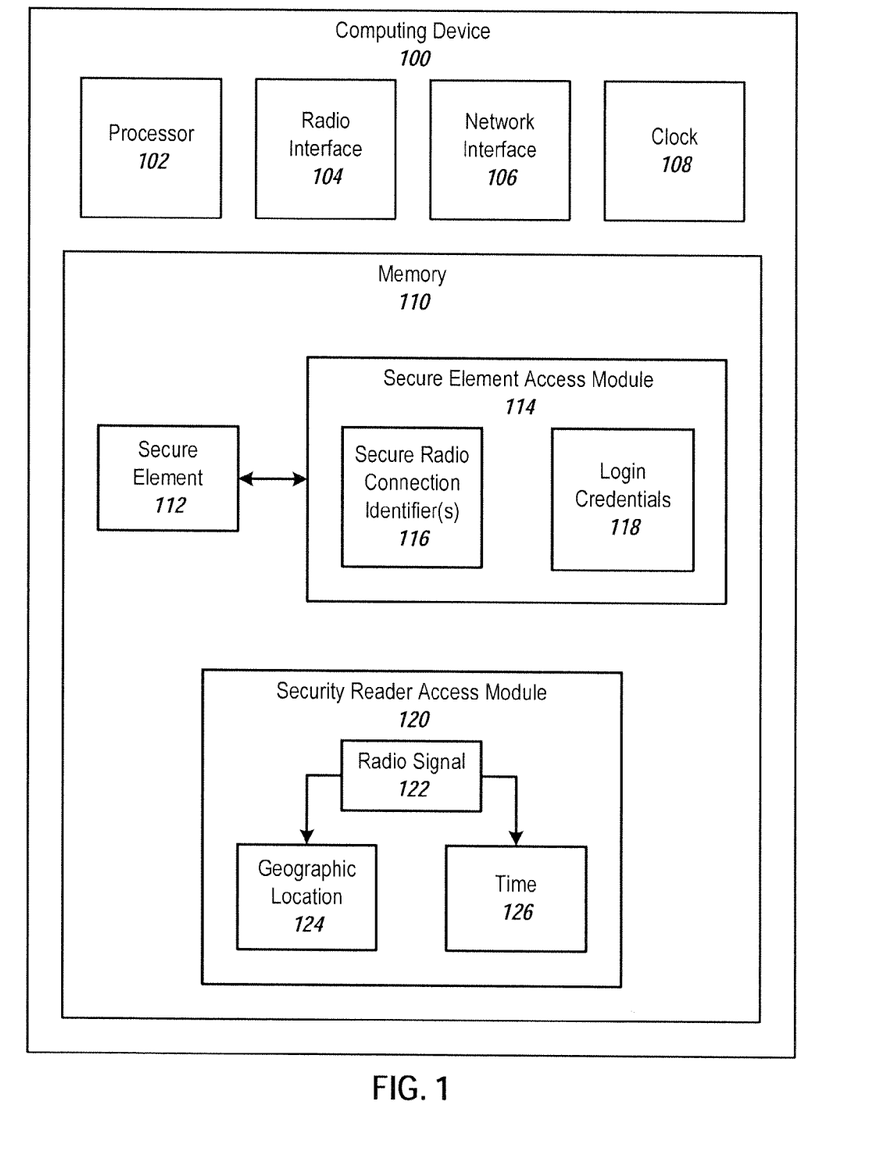
FIG. 1 is a block diagram of an example computing device storing a security mechanism.

With this overview, reference now is made in detail to the examples illustrated in the accompanying drawings and discussed below. FIG. 1 is a block diagram of an example computing device 100 storing a security mechanism. The computing device 100 may be a mobile phone, a digital music player, a personal digital assistant (PDA), a tablet computer, a laptop computer, a desktop computer, etc. As shown, the computing device 100 includes a processor 102, a radio interface 104, a network interface 106, a clock 108, and a memory 110. The processor 102 is configured to execute instructions stored in a machine-readable medium, for example, the memory 110. While a single processor 102 is illustrated, the computing device 100 may include a single processor 102 or multiple processors 102. The radio interface 104 may include a radio transmitter and/or a radio receiver and is configured to transmit and/or receive radio signal(s). The radio interface 104 may include an interface for one or more of a WiFi radio, a GPS radio, a Bluetooth® radio, a NFC radio, a short-range radio, or a long-range radio. As used herein, the term "radio," encompasses its plain and ordinary meaning including, but not limited to, a device including a transmitter and a receiver. For example, the NFC radio, which may be included in the radio interface 104, may include an NFC transmitter (e.g., NFC tag device) and a NFC receiver (e.g., NFC reader). The network interface 106 includes an interface for transmitting and/or receiving data in a network, for example, a wired network, a wireless network, or a cellular network. The clock 108 is configured to determine a current time and to provide the current time to the memory 110.

While a separate radio interface 104 and network interface 106 are illustrated, in some examples, the radio interface 104 may include all or a portion of the network interface 106 or the network interface 106 may include all or a portion of the radio interface 104. For example, both the network interface 106 and the radio interface 104 may include a WiFi radio interface. The network interface 106 may also include a wired Ethernet network interface, which is not part of the radio interface 104. The radio interface 104 may include a short-range radio (e.g., Bluetooth®) interface, which is not part of the network interface 106.

The memory 110 may include one or more of a cache unit, a storage unit, a long-term memory or a short-term memory. The memory 110 stores data and/or instructions. As shown, the memory 110 includes a security mechanism 112, a security mechanism access module 114, and a security reader access module 120.

The security mechanism 112 may be a "home screen" on a computing device 100, which provides an interface for accessing data or applications stored in the memory 110 of the computing device 100. In some cases, a user may be required to enter a password to view the "home screen," in order to prevent unauthorized people from accessing the data or applications of the user. Alternatively, the security mechanism 112 may be an application (e.g., an online banking application, a brokerage application, an email application etc.) that is accessible by providing login credentials.

The security mechanism access module 114 stores instructions for providing access to the security mechanism 112 and data used in implementing these instructions. As shown, the security mechanism access module stores secure radio connection identifier(s) 116 and login credentials 118. The secure radio connection identifier(s) 116 are set by the user and are useful to indicate that the user is in a secure location. For example, the secure radio connection identifier(s) 116 may include identifier(s) of an accessory such as a Bluetooth® headphone/earpiece, a WiFi radio in the user's home or office, a Bluetooth® radio coupled with a microphone and a speaker in the user's vehicle, or a Bluetooth® exercise or fitness measuring device worn by the user. The login credentials 118 may include login credentials 118 that the user may enter to access the security mechanism 112. The login credentials 118 may be, for example, a password for accessing the "home screen" of the computing device 100 or a username and password for accessing an application (e.g., an online banking application) of the computing device.

In communication with the security mechanism access module 114, for example, when executing code stored in the security mechanism access module 114, the processor 102 receives a request for access to the security mechanism 112. The processor 102, responsive to the request, identifies a radio connection of the radio interface 104 at a time of receiving the request for access. The processor 102 determines whether the identified radio connection corresponds to one of the secure radio connection identifier(s) 116. If so, the processor 102 automatically grants the user access to the security mechanism 112 without soliciting the user for the login credentials 118. If not, the processor 102 requests login credentials 118 from the user and, upon receiving valid login credentials 118, grants the user access to the security mechanism 112.

The security reader access module 120 stores a radio signal 122 that is associated with a geographic location 124 (e.g., a GPS signal indicates a geographic location or a NFC signal from a NFC transmitter at a specified geographic location) and a time 126 determined using the clock 108 when the radio signal 122 was received. In communication with the security reader access module 120, for example, when executing code stored in the security mechanism access module 114, the processor 102 receives the radio signal 122 including the geographic location 124 and a time 126. The processor 102 stores, in the memory 110 of the computing device 100, the geographic location 124 and the time 126. The processor 102 receives from a security reader, for example, using the radio interface 104 or the network interface 106, a request for authentication information for granting access through a security checkpoint. The processor 102, responsive to the request for the authentication information, provides, for example using the radio interface 104 or the network interface 106, the security reader with the geographic location 124 and the time 126 associated with the time of receipt of the radio signal 122. The processor 102 receives permission to access the security checkpoint upon determination that the geographic location 124 and the time 126 satisfy a predetermined criterion. For example, the predetermined criterion may be that the time 126 is within the last two hours and the geographic location corresponds to the user's home address, as set forth on the user's driver's license.

In some implementations, the processor 102 makes a determination whether to access the security mechanism access module 114 or the security reader access module 120 based on the input provided to the computing device 100. For example, if the input is a user input for accessing the security mechanism 112, (e.g., a user input for viewing the home screen when the computing device 100 is in sleep mode) the processor 102 accesses the security mechanism access module 114. If the input provided to the computing device 100 is a request to communicate with a security reader to enter a secure location, such as an office building or an airport, the processor 102 accesses the security reader access module 120.

Figure 2:
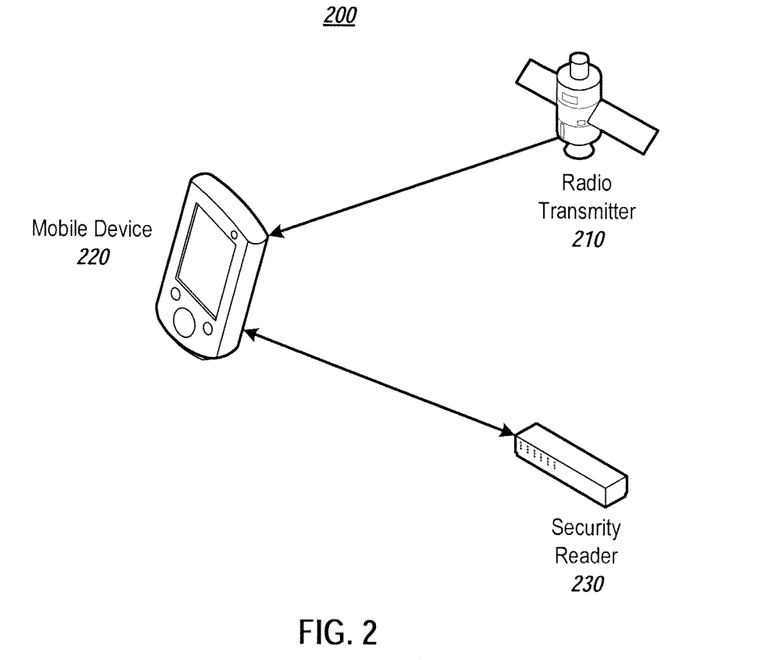
FIG. 2 is a block diagram of an example system for accessing a security reader using a mobile device.

FIG. 2 is a block diagram of an example system 200 for accessing a security reader using a mobile device. As shown, the system 200 includes a radio transmitter 210, a mobile device 220, and a security reader 230. The mobile device 220 may correspond to the computing device 100 of FIG. 1. The mobile device 220 may be a mobile phone, a digital music player, a personal digital assistant (PDA), a tablet computer, a laptop computer, etc. As shown in FIG. 2, the radio transmitter 210 (which is illustrated as a satellite, but may be any radio transmitter, for example a satellite, a NFC transmitter, a short-range radio (e.g., Bluetooth®) transmitter, or a WiFi transmitter) transmits a signal to the mobile device 220. The signal is associated with geographic location information and a timestamp. The mobile device 22 then forwards the geographic location and the timestamp to the security reader 230. Based on the geographic location and the timestamp, the security reader 230 may allow the user of the mobile device 220 to pass through a security checkpoint, go through a simplified security screening, and/or go through a regular security screening.

Figure 3:
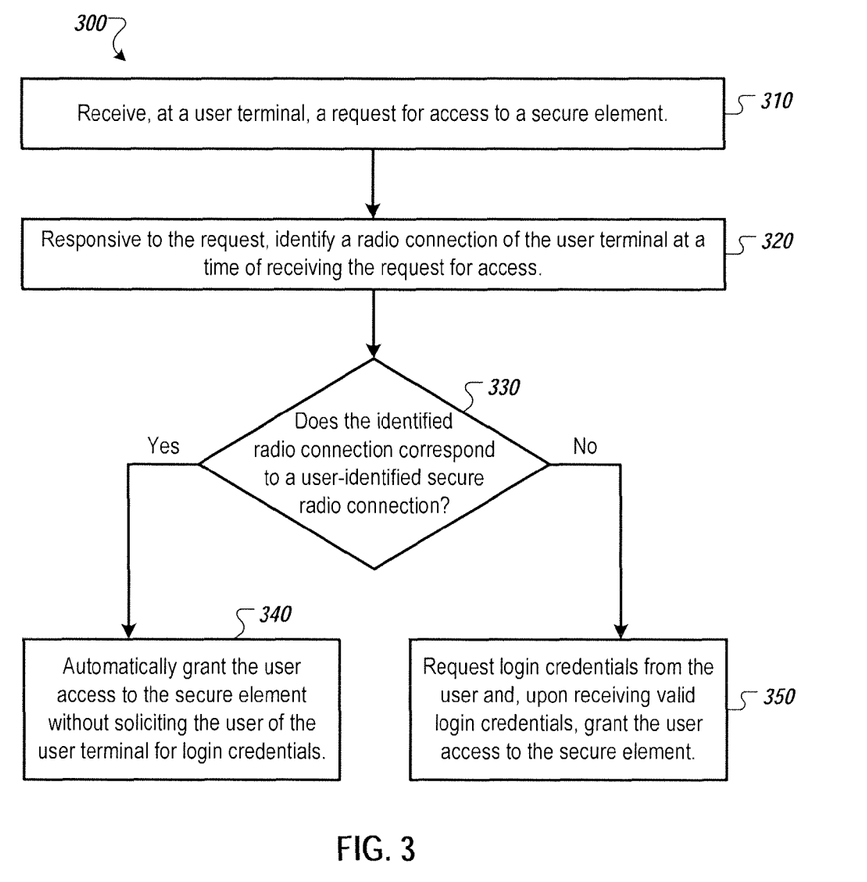
FIG. 3 is a flow chart of an example process for accessing a security mechanism at a user terminal.

FIG. 3 is a flow chart of an example process 300 for accessing a security mechanism at a user terminal.

The process 300 begins at step 310, where a user terminal (e.g., computing device 100) receives a request for access to a security mechanism. The security mechanism may be a "home screen" of the user terminal or a secure application executing on the user terminal. The "home screen" may include a display for accessing data or applications on the user terminal and may be the screen that is displayed after the user terminal is powered on or placed in awake mode rather than in sleep mode. The request for access to the security mechanism may include powering on the user terminal, waking up the user terminal from sleep mode, or instantiating the secure application.

In step 320, responsive to the request, the user terminal identifies a radio connection of the user terminal at a time of receiving the request for access. The radio connection may include one or more of a WiFi connection or a short-range radio (e.g., Bluetooth®) connection. The radio connection may be a connection to a network via a router or a connection to an external device (e.g., an external microphone or speaker) for one-way or two-way communication with the external device.

In step 330, the user terminal determines whether the identified radio connection corresponds to a user-identified secure radio connection. Identifier(s) of the user-identified secure radio connection(s) may be stored in the user terminal (e.g., secure radio connection identifier(s) 116) and entered into the user terminal by the user. In some examples, the user-identified secure radio connection(s) correspond to radio connection(s) that are not likely to be accessible to persons who the user does not trust. For example, the WiFi network in the user's home or the short-range radio (e.g., Bluetooth®) connection in the user's vehicle may be accessible to the user and the user's family members, who the user trusts, but rarely accessible to other people. If the identified radio connection corresponds to the user-identified secure radio connection, the process 300 continues to step 340. Otherwise, the process 300 continues to step 350.

In step 340, if the identified radio connection corresponds to the user-identified secure radio connection, the user terminal automatically grants the user access to the security mechanism. The user is not solicited to enter the login credentials. For example, if the security mechanism is the "home screen" of the user terminal, the user does not need to enter the password for the user terminal. If the security mechanism is an application, the user does not need to enter his/her username or password for the application. After step 340, the process 300 ends.

In step 350, if the identified radio connection does not correspond to the user-identified secure radio connection, the user terminal requests login credentials from the user. For example, if the security mechanism is the "home screen" of the user terminal, the user is requested to enter the password for the user terminal. If the security mechanism is an application, the user is requested to enter his/her username and password for the application. Upon receiving valid login credentials, the user terminal grants the user access to the security mechanism. After step 350, the process 300 ends.

Figure 4:
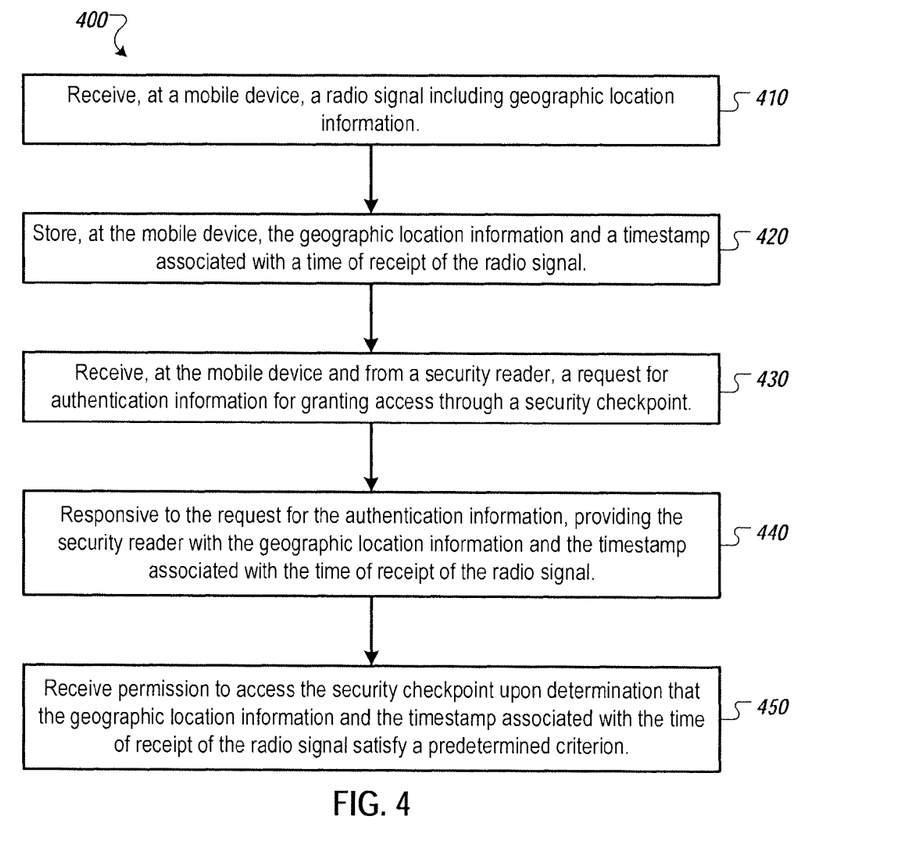
FIG. 4 is a flow chart of an example process for accessing a security checkpoint using a mobile device.

FIG. 4 is a flow chart of an example process 400 for accessing a security checkpoint using a mobile device.

The process 400 begins at step 410, where a mobile device (e.g., computing device 100 or mobile device 220) receives (e.g., from radio transmitter 210) a radio signal including geographic location information. The radio signal may be received via a GPS receiver, via a WiFi receiver (e.g., from one or more WiFi routers at a known geographic location), via a NFC receiver (e.g., from a NFC transmitter at a known geographic location), or via any other radio receiver. The geographic location information indicates a geographic location of the mobile device. In some examples, the radio signal includes GPS signals and the geographic location information includes a geographic location determined based on the GPS signals. In some examples, the radio signal includes WiFi signal(s), and the geographic location information includes a geographic location determined based on the WiFi signal(s), for example, using a lookup in a data repository to determine geographic location(s) corresponding to the WiFi signals.

In step 420, the mobile device stores, in a memory (e.g., memory 110) of the mobile device, the geographic location information (e.g., geographic location 124) and a timestamp (e.g., time 126) associated with a time of receipt of the radio signal (e.g., radio signal 122). The timestamp may be provided by the source of the radio signal. Alternatively, the timestamp may be generated at the mobile device using a clock (e.g., clock 108) of the mobile device.

In step 430, the mobile device receives, from a security reader (e.g., security reader 230), a request for authentication information for granting access through a security checkpoint. The security reader may be operated by a security guard, for example, at an airport, a high-rise building, or a government building. The security reader may communicate with the mobile device using any communication technology, for example, NFC technology.

In step 440, the mobile device, responsive to the request for the authentication information, provides the security reader with the geographic location information and the timestamp associated with the time of receipt of the radio signal. In some examples, the geographic location information includes an indication that the mobile device received a signal from a specified NFC transmitter (e.g., a NFC transmitter at a parking garage) to indicate that the user of the mobile device is coming from the parking garage. In some examples, the geographic location information includes GPS information to indicate that the user of the mobile device was at an indicated latitude and longitude at an indicated time.

In step 450, the mobile device receives permission to access the security checkpoint (e.g., to enter the building or the airport) upon determination that the geographic location information and the timestamp associated with the time of receipt of the radio signal satisfy a predetermined condition. The predetermined condition may include the timestamp corresponding to a time within a threshold time period of the current time, and the geographic location information corresponding to a predetermined geographic location.

The determination that the geographic location information and the timestamp satisfy the predetermined condition may be made at the security reader. For example, the security reader may verify that the user was in the parking garage with the NFC transmitter during the last 10 minutes or that the user was at his/her home address, as indicated on his/her driver's license, during the last two hours. If the mobile device lacks the geographic location information or the timestamp, or the geographic location information and the timestamp do not satisfy the predetermined condition, the user may receive permission to access the security checkpoint using an alternative technique, for example, by passing an interview with the security guard or presenting an employee identification card. After step 450, the process 400 ends.

As shown by the above discussion, functions relating to mobile device security may be implemented on computers connected for data communication via the components of a packet data network. Although special purpose devices may be used, such devices also may be implemented using one or more hardware platforms intended to represent a general class of data processing device commonly used to run programming so as to implement the functions discussed above.

As known in the mobile communications field, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the content media editing. The software code is executable by the general-purpose computer that functions as the computing device 100 or the mobile device 220. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for allowing the user to edit media content to an acceptable size for successful transmission over the network, in essentially the manner performed in the implementations discussed and illustrated herein.

Figures 5, 6:
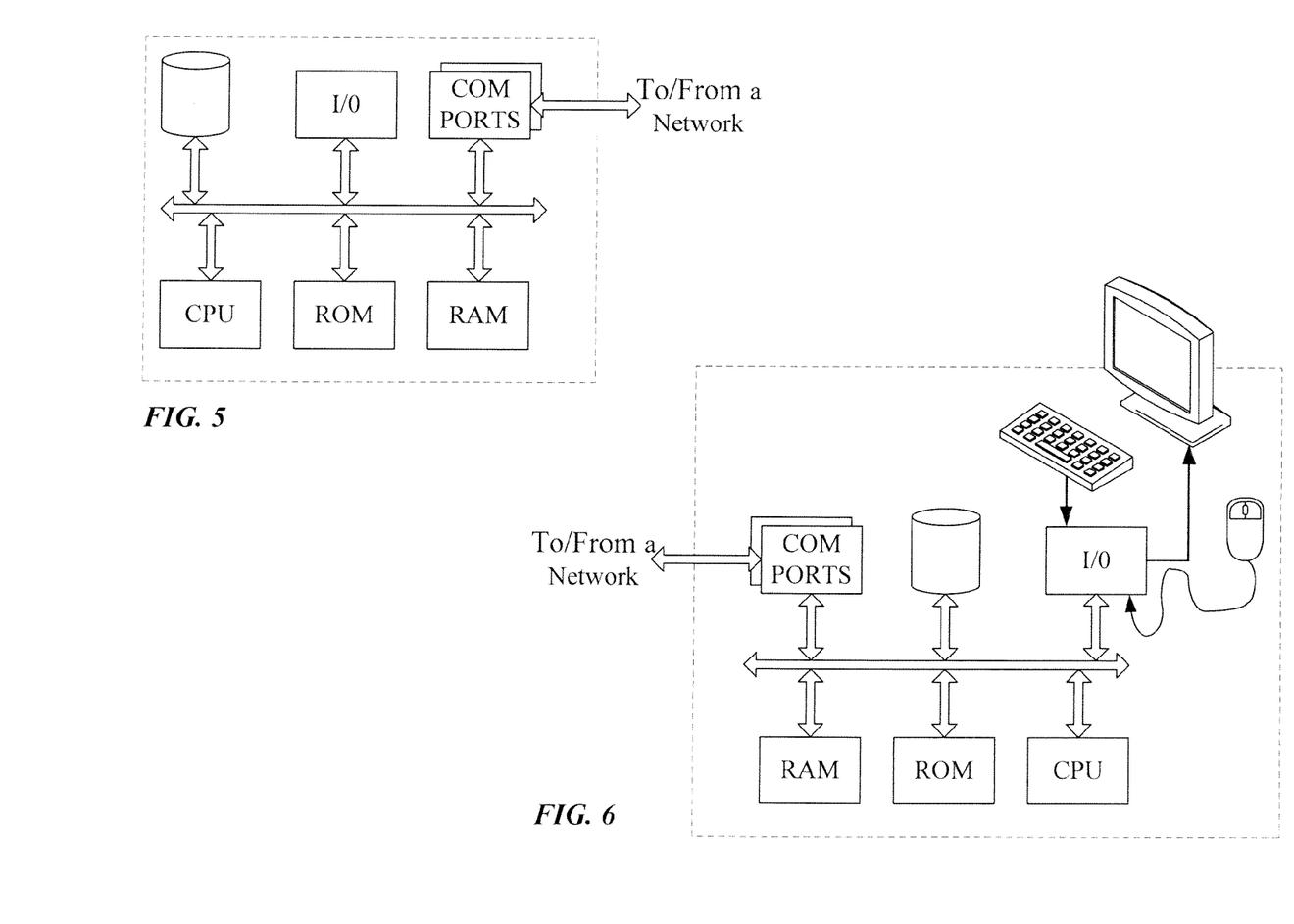
FIG. 5 is a simplified functional block diagram of an example computer that may be configured to function as the computing device of FIG. 1 or the mobile device of FIG. 2.
FIG. 6 is a simplified functional block diagram of an example personal computer or other work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that the general structure and general operation of such equipment as shown in FIGS. 5 and 6 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the methods of managing information about content transmission outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the application(s) 150, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

In some aspects, the subject technology relates to a method. The method includes receiving, at a user terminal, a request for access to a security mechanism. The method includes responsive to the request, identifying a short-range radio connection of the user terminal at a time of receiving the request for access. The method includes accessing a memory of the user terminal to determine whether the identified short-range radio connection corresponds to a user-identified secure radio connection. The method includes, upon determining that the short-range radio connection corresponds to the user-identified secure radio connection, granting a user of the user terminal access to the security mechanism without soliciting the user for a predetermined security input. The method includes, upon determining that the short-range radio connection does not correspond to the user-identified secure radio connection, soliciting the user for the predetermined security input.

In some examples the user-identified secure radio connection includes a Wi-Fi connection associated with a home or office of the user, and the security mechanism includes a security mechanism to enable user access to data or applications on the user terminal.

In some examples, the user-identified secure radio connection includes a Wi-Fi connection associated with a home or office of the user, and the security mechanism includes a secure application on the user terminal.

In some examples, accessing the memory of the user terminal to determine whether the identified short-range radio connection corresponds to the user-identified secure radio connection includes determining whether the identified short-range radio connection is associated with a user-identified device.

In some examples, the user-identified device includes a microphone or speaker residing within a vehicle of the user.

In some examples, the user-identified device includes an exercise or fitness measuring device of the user.

In some examples, the predetermined security input includes a first password having a first number of characters.

In some examples, the method also includes, upon determining that the short-range radio connection corresponds to the user-identified secure radio connection, soliciting the user for a second password having a second number of characters prior to granting the user access to the security mechanism, wherein the first number exceeds the second number.

In some examples, the method also includes, upon determining that the short-range radio connection corresponds to the user-identified secure radio connection, granting a user of the user terminal access to the security mechanism without soliciting the user for any password.

In some aspects, the subject technology relates to a method. The method includes receiving, at a mobile device, a radio signal including geographic location information. The method includes storing, at the mobile device, the geographic location information and a timestamp associated with a time of receipt of the radio signal. The method includes receiving, at the mobile device and from a security reader, a request for authentication information for granting access through a physical security checkpoint. The method includes responsive to the request for the authentication information, providing the security reader with the geographic location information and the timestamp associated with the time of receipt of the radio signal. The method includes modifying access rights of a user of the mobile device at the physical security checkpoint upon determination that the geographic location information and the timestamp associated with the time of receipt of the radio signal satisfy a predetermined criterion.

In some examples, the method also includes determining a current time prior to providing the security reader with the geographic location information and the timestamp. In some examples, the method also includes determining a time difference between the current time and a time of the timestamp, wherein the geographic location information is provided to the security reader in response to the time difference being below a threshold time difference.

In some examples, the security reader is provided with the timestamp for verifying, at the security reader, that a time difference between a current time and a time of the timestamp is below a threshold time difference.

In some examples, modifying the access rights of the user of the mobile device at the physical security checkpoint includes providing the user with permission to pass through the physical security checkpoint or to undergo a simplified security check at the physical security checkpoint.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, at a mobile device, a radio signal including geographic location information;
storing, at the mobile device, the geographic location information and a timestamp associated with a time of receipt of the radio signal;
receiving, at the mobile device and from a security reader, a request for authentication information for granting access through a physical security checkpoint, wherein a geographic location of the physical security checkpoint is different from a geographic location indicated by the geographic location information;
responsive to the request for the authentication information, providing the security reader with the geographic location information and the timestamp associated with the time of receipt of the radio signal;
modifying access rights of a user of the mobile device at the physical security checkpoint upon determination that the geographic location information and the timestamp associated with the time of receipt of the radio signal satisfy a predetermined criterion;
determining a current time prior to providing the security reader with the geographic location information and the timestamp; and
determining a time difference between the current time and a time of the timestamp, wherein:
the geographic location information is provided to the security reader in response to the time difference being below a threshold time difference, and
the threshold time difference is determined based on a distance or a travel time between the geographic location indicated by the geographic location information and the geographic location of the physical security checkpoint.

2. The method of claim 1, wherein modifying the access rights of the user of the mobile device at the physical security checkpoint comprises: providing the user with permission to pass through the physical security checkpoint or to undergo a simplified security check at the physical security checkpoint.

3. The method of claim 1, wherein the threshold time difference is determined based on the distance between the geographic location indicated by the geographic location information and the geographic location of the physical security checkpoint.

4. The method of claim 1, wherein the threshold time difference is determined based on the travel time between the geographic location indicated by the geographic location information and the geographic location of the physical security checkpoint.

5. The method of claim 1, wherein modifying the access rights of the user of the mobile device includes modifying the access rights of the user of the mobile device upon determination that the geographic location information corresponds to a predetermined geographic location information and the time difference between the current time and the time of the timestamp is below the threshold time difference.

6. A method comprising:
receiving, at a mobile device, a radio signal including geographic location information;
storing, at the mobile device, the geographic location information and a timestamp associated with a time of receipt of the radio signal;
receiving, at the mobile device and from a security reader, a request for authentication information for granting access through a physical security checkpoint, wherein a geographic location of the physical security checkpoint is different from a geographic location indicated by the geographic location information;
responsive to the request for the authentication information, providing the security reader with the geographic location information and the timestamp associated with the time of receipt of the radio signal; and
modifying access rights of a user of the mobile device at the physical security checkpoint upon determination that the geographic location information and the timestamp associated with the time of receipt of the radio signal satisfy a predetermined criterion, wherein:
the security reader is provided with the timestamp for verifying, at the security reader, that a time difference between a current time and a time of the timestamp is below a threshold time difference, and
the threshold time difference is determined based on a distance or a travel time between the geographic location indicated by the geographic location information and the geographic location of the physical security checkpoint.

7. The method of claim 6, wherein modifying the access rights of the user of the mobile device at the physical security checkpoint comprises: providing the user with permission to pass through the physical security checkpoint.

8. The method of claim 6, wherein modifying the access rights of the user of the mobile device at the physical security checkpoint comprises: providing the user with permission to undergo a simplified security check at the physical security checkpoint.

9. The method of claim 6, wherein the threshold time difference is determined based on the distance between the geographic location indicated by the geographic location information and the geographic location of the physical security checkpoint.

10. The method of claim 6, wherein the threshold time difference is determined based on the travel time between the geographic location indicated by the geographic location information and the geographic location of the physical security checkpoint.

11. The method of claim 6, wherein modifying the access rights of the user of the mobile device includes modifying the access rights of the user of the mobile device upon determination that the geographic location information corresponds to a predetermined geographic location information and the time difference between the current time and the time of the timestamp is below the threshold time difference.

* * * * *